(12) United States Patent
Bernath et al.

(10) Patent No.: US 10,938,890 B2
(45) Date of Patent: Mar. 2, 2021

(54) SYSTEMS AND METHODS FOR MANAGING THE PROCESSING OF INFORMATION ACQUIRED BY SENSORS WITHIN AN ENVIRONMENT

(71) Applicant: Toshiba Global Commerce Solutions Holdings Corporation, Tokyo (JP)

(72) Inventors: David Bernath, Research Triangle Park, NC (US); Phuc Do, Research Triangle Park, NC (US); Dean Herring, Research Triangle Park, NC (US); Abhishekh Padmanabhan, Research Triangle Park, NC (US); Adrian Rodriguez, Research Triangle Park, NC (US); David Steiner, Research Triangle Park, NC (US); Jonathan Waite, Research Triangle Park, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 218 days.

(21) Appl. No.: 15/935,088

(22) Filed: Mar. 26, 2018

(65) Prior Publication Data
US 2019/0297139 A1    Sep. 26, 2019

(51) Int. Cl.
*H04L 29/08* (2006.01)
*G06Q 30/06* (2012.01)

(52) U.S. Cl.
CPC ........ *H04L 67/1002* (2013.01); *H04L 67/327* (2013.01); *G06Q 30/0633* (2013.01); *H04L 67/12* (2013.01)

(58) Field of Classification Search
CPC ... H04L 67/1002; H04L 67/327; H04L 67/12; G06Q 30/0633
See application file for complete search history.

(56) References Cited

U.S. PATENT DOCUMENTS 7,319,479 B1    1/2008  Crabtree et al.
8,068,986 B1   11/2011  Shahbazi et al.
(Continued)

FOREIGN PATENT DOCUMENTS

WO       2013123445 A1     8/2013

OTHER PUBLICATIONS

Vaughan-Nichols, Steven, "Build your own supercomputer out of Raspberry Pi boards" ZDNet, May 23, 2013, pp. 1-31. http://www.zdnet.com/article/build-your-own-supercomputer-out-of-raspberry-pi-boards/.

(Continued)

*Primary Examiner* — Nicholas R Taylor
*Assistant Examiner* — Sanjoy Roy
(74) *Attorney, Agent, or Firm* — Olive Law Group, PLLC

(57) ABSTRACT

Systems and methods for managing the processing of information acquired by sensors within an environment are disclosed herein. According to an aspect, a system includes multiple sensors configured to acquire information about an environment. The system may also include computing devices that are each operatively connected to a respective one of the sensors. Further, each computing device may be configured to determine an object and/or action within the environment based on the acquired information. The system may include a processing manager configured to determine whether a first computing device among the plurality of computing devices does not have predetermined resource availability for determining the object and/or action. The processing manager may control the first computing device to communicate the information to a second computing device for determining the one of the object and action in response to determining that the first computing device does not have the predetermined resource availability.

25 Claims, 5 Drawing Sheets

(56) References Cited

U.S. PATENT DOCUMENTS

| | | |
|---|---|---|
| 8,174,572 B2 | 5/2012 | Buehler et al. |
| 9,791,910 B1 | 10/2017 | Brown et al. |
| 2004/0143602 A1 | 7/2004 | Ruiz et al. |
| 2005/0012817 A1 | 1/2005 | Hampapur et al. |
| 2006/0077254 A1* | 4/2006 | Shu .................. G08B 13/19608 348/143 |
| 2007/0150565 A1 | 6/2007 | Ayyagari et al. |
| 2007/0282665 A1 | 12/2007 | Buehler et al. |
| 2007/0291118 A1* | 12/2007 | Shu .......................... H04N 7/18 348/156 |
| 2011/0106624 A1* | 5/2011 | Bonner .............. G06Q 30/0261 705/14.58 |
| 2012/0033861 A1* | 2/2012 | Dai ...................... G06K 9/6254 382/128 |
| 2012/0195363 A1* | 8/2012 | Laganiere ........... H04L 12/6418 375/240.01 |
| 2013/0195319 A1* | 8/2013 | Petrescu .............. G06K 9/6857 382/103 |
| 2013/0235206 A1* | 9/2013 | Smith .................... H04N 7/181 348/150 |
| 2013/0295894 A1* | 11/2013 | Rhoads ............... H04M 1/0264 455/414.1 |
| 2014/0258028 A1* | 9/2014 | Bynum .............. G01C 21/3484 705/26.8 |
| 2015/0262116 A1* | 9/2015 | Katircioglu .......... G06Q 10/087 705/28 |
| 2015/0312535 A1 | 10/2015 | Borger et al. |
| 2016/0094121 A1* | 3/2016 | Cowley .................... G05F 1/56 323/273 |
| 2016/0132722 A1 | 5/2016 | Yarp et al. |
| 2017/0270371 A1 | 9/2017 | Sekaran et al. |

OTHER PUBLICATIONS

Yang, Jiachen et al. "Analysis of Camera Arrays Applicable to the Internet of Things" Sensors, 2016, pp. 1-20, vol. 16, Issue 3. http://www.mdpi.com/1424-8220/16/3/421/htm.

\* cited by examiner

SYSTEMS AND METHODS FOR MANAGING THE PROCESSING OF INFORMATION ACQUIRED BY SENSORS WITHIN AN ENVIRONMENT

TECHNICAL FIELD

The presently disclosed subject matter relates to sensing activity and objects within an environment. More particularly, the presently disclosed subject matter relates to systems and methods for managing the processing of information acquired by sensors within an environment.

BACKGROUND

In retail environments, such as grocery stores and other "brick and mortar" stores, currently customers typically shop within a store and subsequently proceed to checkout at a point of sale (POS) terminal. The POS terminal may operate to conduct a self-checkout purchase transaction with the customer, or the POS terminal may operate to conduct a purchase transaction with the customer with assistance of store personnel. Such purchase transactions typically involve scanning a bar code of each product for purchase by the customer in order to calculate and display a total amount owed by the customer for the products. Subsequently, a purchase transaction for the customer may be completed after entry of payment information by the customer or store personnel.

There have been advances to make the retail store shopping experience more convenient for customers such that a POS terminal is not needed. For example, in some efforts, a retail store system uses video cameras and various other sensors to identify and track a customer for the purpose of identifying the products the customer places in his or her shopping bag or cart. Subsequently, when the customer leaves the store with the products, the system can automatically conduct a purchase transaction for the selected products for the identified customer. Although such advances have made shopping more convenient for customers, there is a continuing need for improvements in the managing of information acquired in the retail store environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for managing the processing of information acquired by sensors within an environment. According to an aspect, a system includes multiple sensors configured to acquire information about an environment. The system may also include computing devices that are each operatively connected to a respective one of the sensors. Further, each computing device may be configured to determine an object and/or action within the environment based on the acquired information. The system may also include a processing manager configured to determine whether a first computing device among the plurality of computing devices does not have predetermined resource availability for determining the object and/or action. The processing manager may also be configured to control the first computing device to communicate information acquired by the first computing device to a second computing device for determining the one of the object and action in response to determining that the first computing device does not have the predetermined resource availability.

According to another aspect, a system includes multiple sensors configured to acquire information about an environment. The system may also include computing devices that are each operatively connected to a respective one of the sensors. Each computing device may be configured to individually determine an object and/or action within the environment based on the acquired information. The acquired information used by each computing device to determine the object and/or action may be different. The system may also include a processing manager configured to receive, from each computing device, the respective determination of the object and/or action. Further the processing manager may be configured to control the first computing device to communicate the information acquired by the first computing device to a second computing device in response to determining that the second computing device has the predetermined resource availability.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

Figure 1:
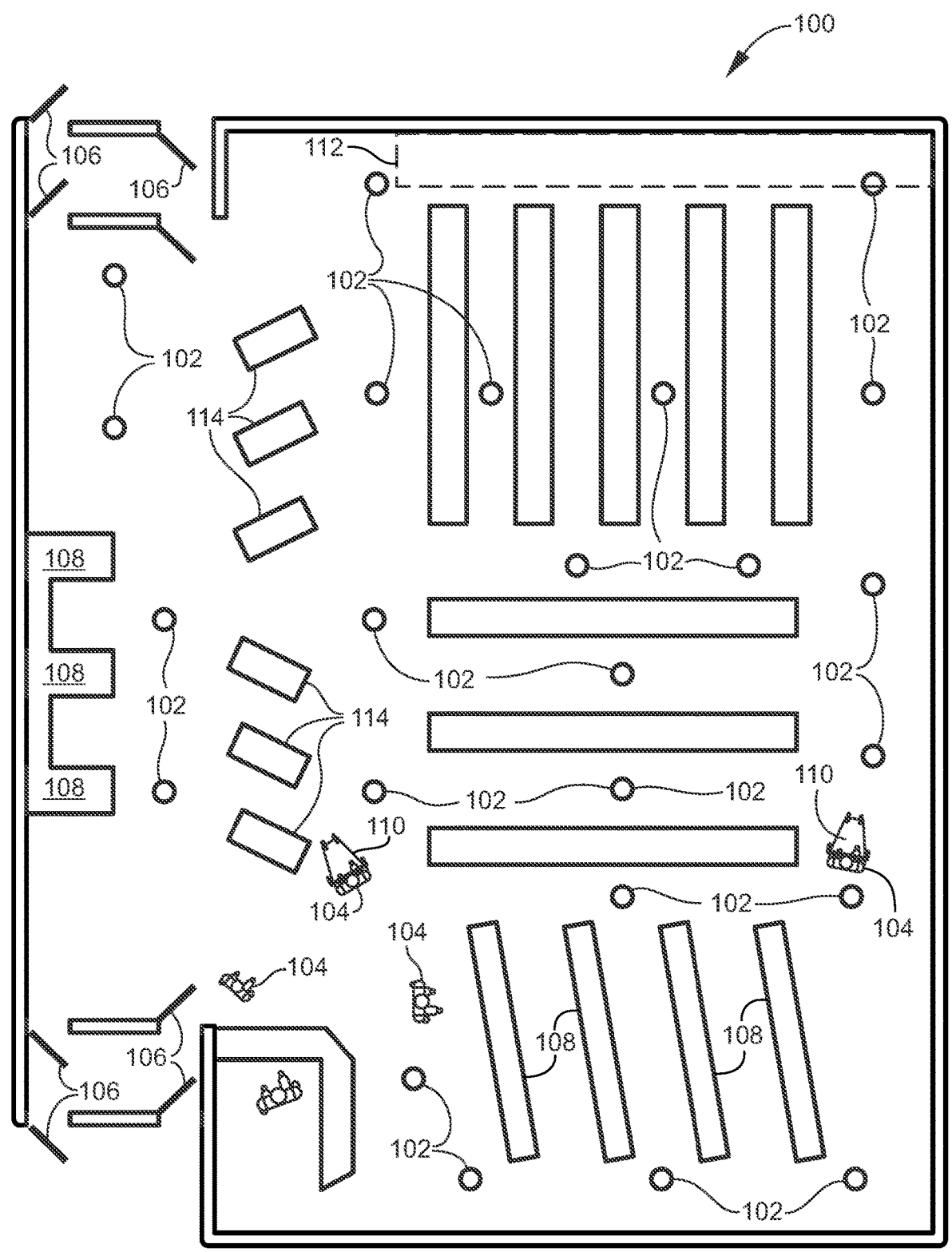
FIG. 1 is a plan view of a retail store including multiple sensors distributed therein for determining objects and actions in accordance with embodiments of the present disclosure

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

The present disclosure provides systems and methods for managing the processing of information acquired by sensors within an environment, such as a "brick and mortar" retail store. In embodiments, a system may include multiple sensors distributed within the environment and each being configured to acquire information about the environment. For example, a sensor may be an image capture device (e.g., a video camera) configured to capture one or more images within the environment. In other examples, a sensor may be any suitable device for acquiring radio frequency identifier data (RFID), weight information, smart shelf data, coordinate information, motion data, and the like. The sensors may be positioned, for example, at different areas of the retail store for acquiring information about customers and products (or other item) for the purpose of determining products placed in the customers' cart or shopping bag, for assisting with the purchase of those products by the customers, and for general assistance of customers with their shopping and experience within the store. A system may include multiple computing devices that are each operatively connected to a respective one of the sensors. The computing devices may be configured to determine an object and action within the environment based on the acquired information either individually or in cooperation with one or more of the other computing devices. Identification of an object and action may subsequently be communicated to another computing device, such as a local server, for use in determining products placed in the customers' cart or shopping bag, for assisting with the purchase of those products by the customers, and for general assistance of customers with their shopping and experience within the store.

In accordance with embodiments, a system may include a processing manager for distributing processing and analysis workload among the computing devices that are operatively connected to the sensors. Particularly, the workload of processing and analyzing the information acquired by the sensors may be distributed among the computing devices for better and more efficiently processing and analyzing the acquired information. The processing manager may be a program running on one or more of the computing devices, The processing manager may be co located with the compute device or remotely located, such as the cloud or a remote server. The processing manager may have agent processes running on one or more of the compute devices. In an example, the processing manager may determine whether one of the computing devices does not have predetermined resource availability for determining either an object or action. Example objects include, but are not limited to, a person, a shopping cart or bag, a product for purchase, and the like. Example actions include, but are not limited to, a person placing a product in his or her shopping cart or bag, a person entering a particular section of a store, a person entering a store, a person exiting a store, and the like. The processing may also control that particular computing device to communicate its acquired information to another computing device for determining the object or action. As a result, the other computing device can assist with determining the object or action in the case where the initial computing device does not have predetermined resource availability, or an availability of resource deemed sufficient. Predetermined resource may be, for example, a processing availability, a memory availability, and/or other availability of the computing device to handle determining the object or action. The recipient computing device may process the acquired information for determining the object or action, and may subsequently return the results to the computing device that originally acquired the information or another computing device.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be, for example, a server. In another example, a computing device may be any type of conventional computer, such as a laptop computer or a tablet computer or a desktop computer. In another example, the computing device may be a battery powered Internet of Things (IoT) device. In another example, a computing device may be a mobile computing device such as, for example, but not limited to, a smart phone, a cell phone, a pager, a personal digital assistant (PDA), a mobile computer with a smart phone client, or the like. In another example, a computing device may be a single-board computer, such as a computer in the Raspberry Pi series of computers developed by the Raspberry Pi Foundation.

The presently disclosed subject matter is now described in more detail. FIG. 1 illustrates a plan view of a retail store 100 including multiple sensors 102 distributed therein for determining objects and actions in accordance with embodiments of the present disclosure. Referring to FIG. 1, customers 104 may enter the retail store 100 through one of the doors 106. A customer 106 may select products for purchase from shelving units 108 and place the products in a cart 110 or basket. The sensors 102 may be video cameras configured and positioned in the ceiling of the store 100 or elsewhere to acquire video of the customers 106 as they move about the store 100 and as they place selected products in their respective carts or baskets. The sensors 102 may each be operatively connected to a respective computing device (not shown) for processing of data acquired by the sensor. In the example of a sensor 102 being a video camera, the associated computing device may receive video data acquired by the video camera and subsequently process the video data. In some examples, a computing device may be directly connected to multiple sensors for locally processing data acquired by the sensor. The information (e.g., video data) acquired by the sensors 102 may be used for the purpose of determining products placed in the customers' cart 110 or shopping bag, for assisting with the purchase of those products by the customers 104, and for general assistance of customers 104 with their shopping and experience within the store 100.

The computing devices operatively connected to sensors 102 may be individually configured to identify customers, products, and the actions of customers for the purpose of determining products placed in the customers' cart 110 or shopping bag, for assisting with the purchase of those products by the customers 104, and for general assistance of customers 104 with their shopping and experience within the store 100. For example, a sensors 102 located within or sufficiently close to a produce section, generally designated by broken lines 112, of the store 100 may implement a model specifically to identify produce, to recognize when a customer places the produce in his or her cart 110 or shopping bag, and to identify the customer. This determined information may be subsequently used by another computing device, such as the store's central server or a remote server, to compile a list of products that the identified customer has collected such that the customer may conveniently purchase the products upon exiting the store 100.

In embodiments, when a customer 104 has finished collecting products and is ready to pay for the products, the customer 104 may proceed to a POS terminal 114 located at a checkout area of the store 100. The customer 104 may identify himself or herself at the POS terminal 114 by, for example, presenting identification information such as a customer loyalty card, a transaction card (e.g., a debit card or a credit card), or a driver's license. Alternatively, the customer 104 may be identified by a sensor 102 located near the POS terminal 114. Subsequently, the collected products associated with the customer 104 may be associated with the customer 104 and displayed or otherwise presented to the customer 104 by the POS terminal 114. The customer 104 may subsequently proceed with purchase of the products by any suitable technique as will be understood by those of skill in the art. After completing the purchase transaction and when ready to leave, the customer 104 may exit the store 100 with the purchased products through one of the doors 106.

In embodiments for purchasing products, when a customer 104 has finished collecting products and is ready to pay for the products, the customer may by-pass the POS terminals 114 and proceed with leaving the store 100 through one of the doors 106. In this scenario, the customer 104 may have a payment account with the store for use in conducting a purchase transaction for the collected products when the customer 104 leaves the store 100. A sensor 102 located near one of the doors 106 may acquire information (e.g., a video) indicating that the customer 104 has left. The computing device associated with the sensor 102 can analyze the information to identify the customer 104 leaving the store 100. Subsequently, a computing device (e.g., the store's server or another server) can receive information indicating the customer 104 has exited the store and conduct a purchase transaction for the collected products by use of payment account information (e.g., credit or debit card information) stored for the identified customer 104. In this way, the customer 104 can conveniently purchase products in the store without use of a POS terminal 114.

Figure 2:
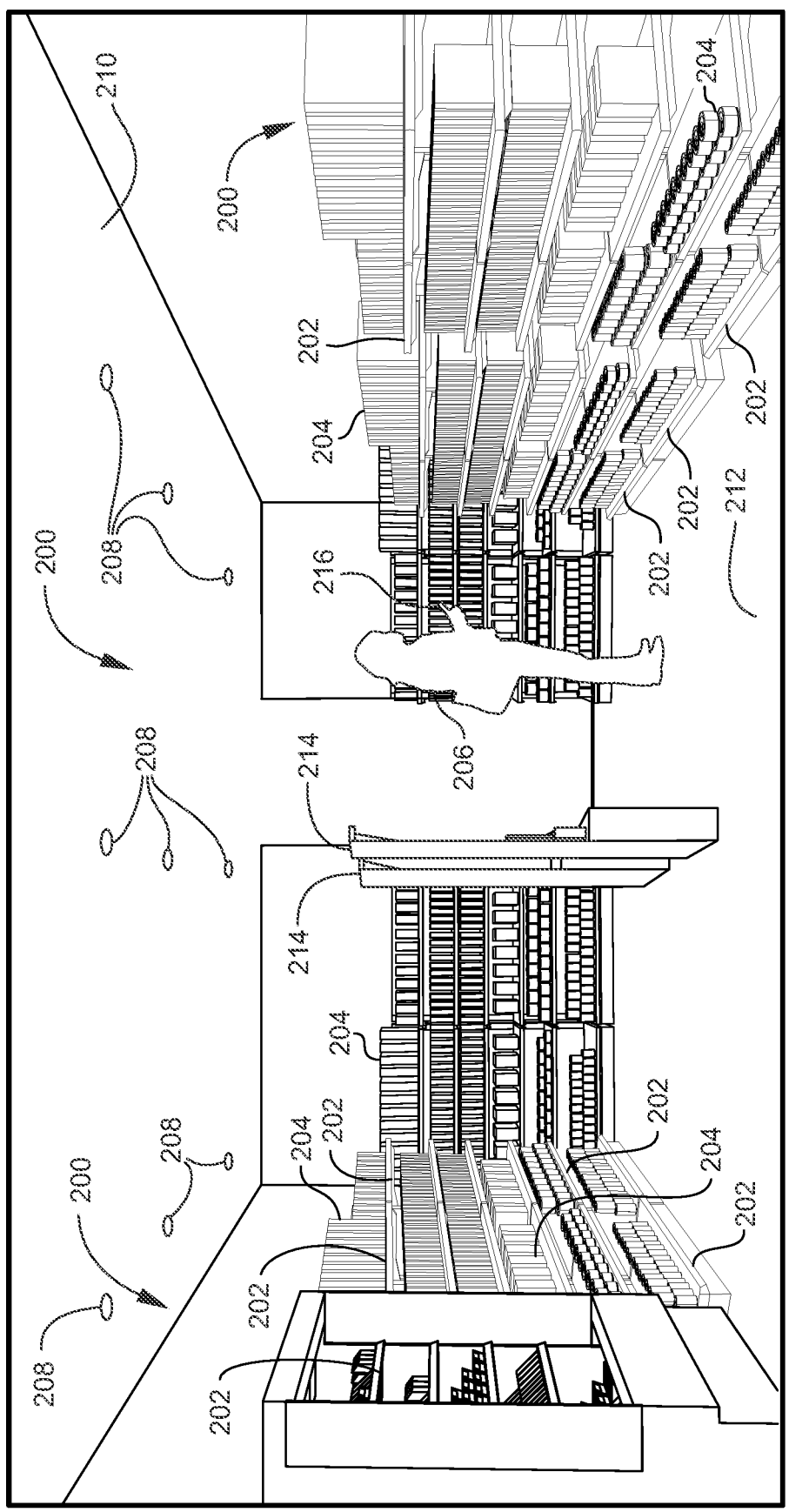
FIG. 2 is a view of an example store including shelves, POS terminals, and an exit from the store in accordance with embodiments of the present disclosure.

FIG. 2 illustrates a view of an example store including shelves, POS terminals, and an exit from the store in accordance with embodiments of the present disclosure. Referring to FIG. 2, the store includes shelving units 200 with shelves 202 and products 204 that are available for selection and purchase by a customer 206. Multiple shelving units 200 may be arranged in the store to form aisles through which customers may navigate.

The store shown in FIG. 2 includes multiple sensors 208 disposed in the ceiling 210. In accordance with embodiments, a computing system of the store may use information acquired by the sensors 208 for determining products being purchased by a customer. For example, the sensors 208 may be video cameras that acquire images of a customer placing a can of soup in the customer's basket and store a record that the customer picked up the can of soup for use (e.g., as a reference) when the customer is checking out. Each sensor 208 may include one or more types of sensors, such as visual sensors (e.g., cameras), audio sensors (e.g., microphones), and motion sensors. Sensors 208 may include actuating devices for orienting the sensors. Sensors 208 may be placed at any suitable position within the store. Example sensor positions include, but are not limited to, below, within, or above the floor 212, within other structural components of the store such as shelving unit 200 or walls. Sensors 208 may be oriented toward an expected location of customer interaction with products, to provide data about the interaction, such as determining the customer's actions.

The store shown in FIG. 2 may include multiple POS terminals 214. Each POS terminal 214 may include computing devices and various input/output (I/O) devices, such as visual displays, audio speakers, cameras, microphones, key pads, and touchscreens for interacting the a customer. According to embodiments, a POS terminal 214 may receive identification of products a customer is purchasing, for example, from computing devices associated with the sensors 208 distributed throughout the store.

In accordance with embodiments, the customer 206 may have a mobile computing device 216 (e.g., a smartphone) that is configured to communicate with the POS terminal 214 or another computing device of the store to complete a purchase transaction for collected products. In accordance with embodiments, the mobile computing device 216 may execute a store application (e.g., an "app") that is connected to networked computing devices using wireless networks accessible within the store (e.g., WI-FI or BLUETOOTH wireless technologies). In other embodiments, the mobile computing device 216 may communicate with the POS terminal 214 when brought within communication range.

The computing system of the store may receive and store determinations of objects, customers, and actions to build transactions for customers. The computing devices associated with sensors may individually or cooperatively recognize various products 204 and customers. The computing devices associated with sensors may also individually or cooperatively recognize actions of customers, such as when a customer places a product in a grocery cart or bag. The computing system (e.g., server) of the store may be networked with the computing devices of the sensors to receive identification of the products, customers, and actions. Subsequently, the computing system may conduct the purchase transaction with a customer at a POS terminal or when the customer exits the store as described herein.

Figure 3:
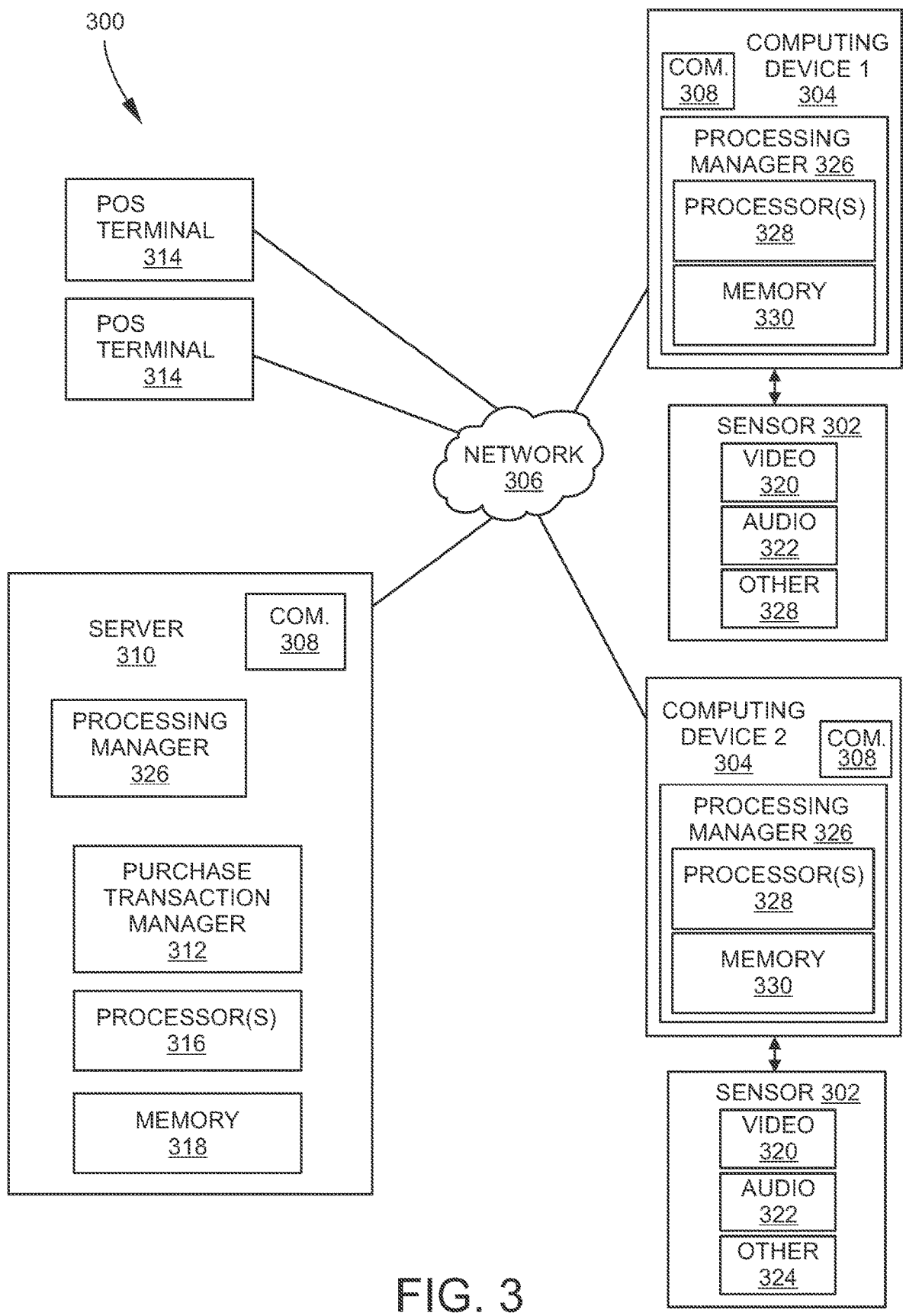
FIG. 3 is a block diagram of an example system 300 for managing the processing of information acquired by sensors within an environment in accordance with embodiments of the present disclosure.

FIG. 3 illustrates a block diagram of an example system 300 for managing the processing of information acquired by sensors within an environment in accordance with embodiments of the present disclosure. In this example, the system is described as being used in the environment of the retail store 100 shown in FIG. 1, but it should be understood that the system may also be used in the environment of another retail store or other suitable environment. Referring to FIG. 3, the system 300 may include multiple sensors 302 that are each operatively connected to one or more computing devices 304. For example, a sensor 302 and a computing device 304 may be positioned at the same location within a retail store, such as at the different positions of the sensors 102 shown in FIG. 1. In some embodiments, the sensor 302 and the computing device 304 may be contained within the same housing. The system 300 may include a communications network 306 (e.g., a wireless or wired local area network) configured to facilitate communication among the computing devices 304. Particularly, the computing devices 304 may each include communication modules 308 configured to operably interface with the network 306 for communication with another computing device 304 or another computing device. Although two pairs of sensors 302 and computing devices 304 are shown in this example, it should be understood that a system in accordance with the present disclosure may include any suitable number of pairs needed for acquiring information within an environment.

The system 300 may include a server 310 that either resides in the store or is located remote from the store. The server 300 may include a purchase transaction manager 312 configured to conduct and support purchase transactions at POS terminals 314. Although only one server 319 and two POS terminals 314 are shown, it should be understood that the system 300 may include any suitable number of servers and POS terminals. The server 310 and POS terminals 314 may operate together for conducting purchase transactions within the store.

POS terminals 314 may receive input from customers and/or produce output to customers with the store. According to embodiments, POS terminals 314 may receive identification of products for purchase directly from the server 310 or one of the computing devices 304. The POS terminals 314 may also receive identification of the customer ready to conduct a purchase transaction from the server 310 or one of the computing devices 304. A POS terminal 314 may include a computing device, a video display, audio speaker(s), a keyboard, a mouse, or the like. In another example, a POS terminal 314 may include a video display and associated driver hardware.

The server 310 may include one or more processor(s) 316, memory 318, and a communications module 308. The server 310 may also include any other suitable hardware, software, firmware, or combinations thereof for operating together with the computing devices 304 and POS terminals 314. In addition, the purchase transaction manager 312 may be implemented by suitable hardware, software, firmware, or combinations thereof for assisting POS terminals 314 with purchase transactions, such as providing customer and product information, assisting with purchase transactions, and for receiving purchase information from POS terminals 314.

Sensors 302 may include video sensors (e.g., video cameras) 320, audio sensors (e.g., microphones) 322, and other sensors 324. The other sensors 324 may include any sensor configured to provide information about customer interactions with the store for purchase of products. For example, sensors 324 may include, but is not limited to, location sensors, weight sensors, and the like. Information acquired by the sensors 302 may be used by an associated computing device 304 for determining an object (e.g., a customer or product) or an action (e.g., a customer places a product in a cart or basket, or a customer places a product back on a shelf). In particular, information acquired by a sensor 302 may be communicated to its respective computing device 304.

The computing device 304 may include a processing manager 326 configured to determine an object or action based on the acquired information. The processing manager 326 may be implemented by suitable hardware, software, firmware, or combinations thereof. For example, the processing manger 326 may include one or more processors 328 and memory 330 for implementing the functionality described herein.

Figure 4:
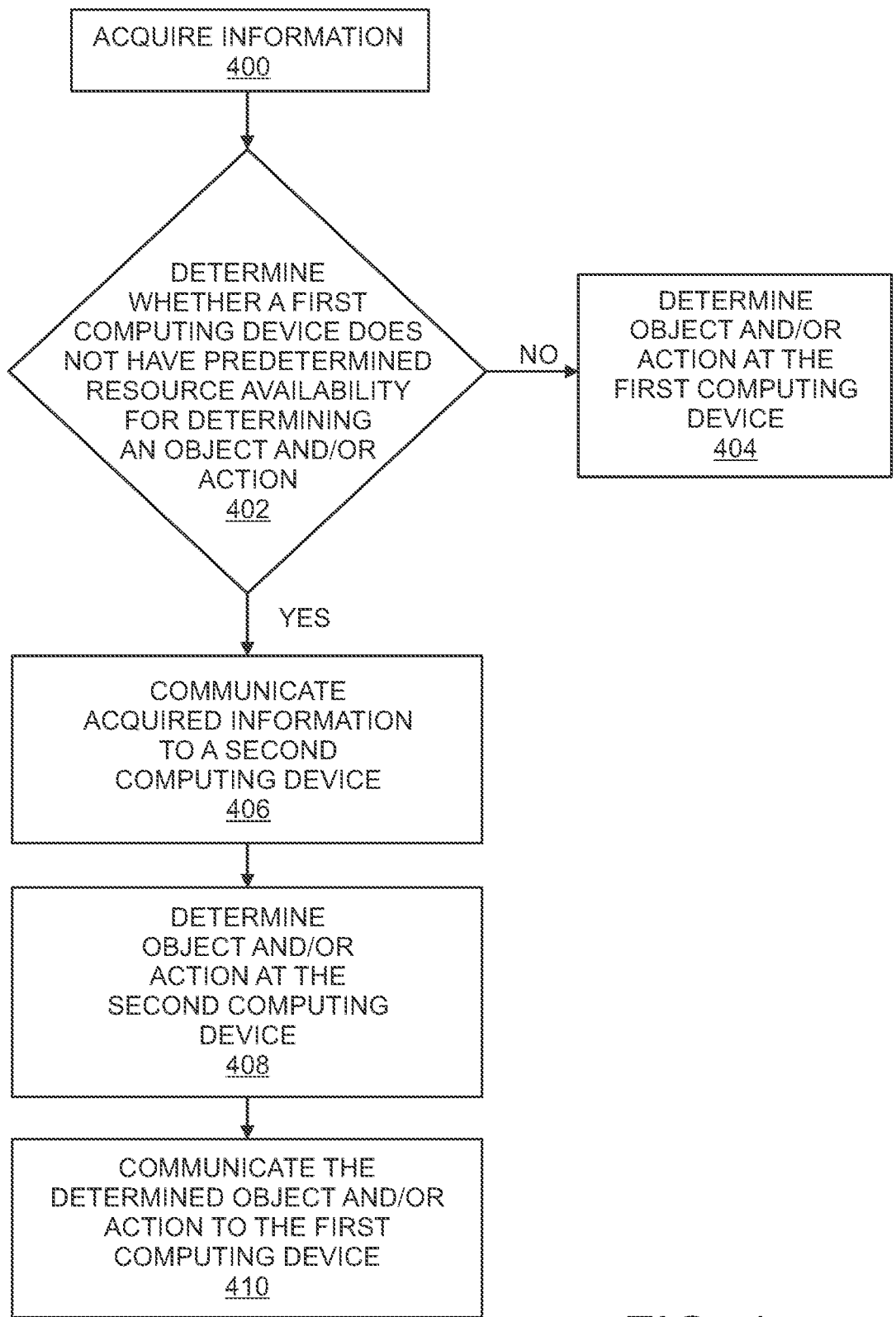
FIG. 4 is a flow chart of an example method for managing processing of information acquired by a sensor in accordance with embodiments of the present disclosure.

In accordance with embodiments, a system may be configured to manage the processing of information acquired by sensors, such as the sensors 102 shown in FIG. 1, the sensors 208 shown in FIG. 2, or the sensors 302 shown in FIG. 3. FIG. 4 is a flow chart of an example method for managing processing of information acquired by a sensor in accordance with embodiments of the present disclosure. The method is described by example as being implemented by one of the sensors 302 and its respective computing device 304 shown in FIG. 3. Alternatively, the method may be implemented by any suitable sensor and computing device.

Referring to FIG. 4, the method includes acquiring 400 information about an environment. For example, the sensors 302 may acquire video and/or audio at areas in proximity to their placement within a retail store. A sensor 302 may also acquire location information of placement in a store. A sensor 302 may also be a weight sensor positioned and integrated with a shelf for detecting when a product is removed from the shelf to thereby indicate removal of a product from the shelf. The sensor 302 may output acquired information for receipt by the computing device 304. In this example, the sensor 302 designated as "SENSOR 1" may capture or acquire video of a customer picking up a box of cereal and then placing the box of cereal in his or her basket.

The method of FIG. 4 also includes determining 402 whether a first computing device does not have predetermined resource availability for determining an object and/or action. Continuing the aforementioned example, the processing manager 326 of the computing device 304 designated as "COMPUTING DEVICE 1" may receive the video captured by "SENSOR 1" and store the video in memory 330. Further, the processing manager 326 of this computing device may determine whether the computing device 304 designated as "COMPUTING DEVICE 1" does not have predetermined resource availability for determining an object and/or action in the received video. For example, the processing manager 326 may determine whether there is not processing availability, memory availability, or other resources of the computing device 304 designated as "COMPUTING DEVICE 1" needed for determining the object and/or action in the received video. Examples of resource availability includes, but are not limited to, system utilization, CPU utilization, and memory utilization. In other examples, resource availability may be determined based on a session model in which it can be determined whether the system was currently in a session or available for a new session. In these examples, there may be session limits and sessions pools for determining availability.

In response to that the first computing device has the predetermined resource availability for determining the object and/or action at block 402, the first computing device may determine 404 the object and/or action. Continuing the aforementioned example, the processing manager 326 of the computing device 304 designated as "COMPUTING DEVICE 1" may proceed with initiating that computing device to determine the object and/or action. Particularly, in this example, the computing device 304 designated as "COMPUTING DEVICE 1" may determine that a customer is picking up a box of cereal and then placing the box of cereal in his or her basket. The computing device 304 may also identify the customer based on profile information stored at the server 310. For example, the computing device 304 may use suitable facial recognition techniques for identify the customer. Further, for example, the computing device 304 may use suitable techniques for identifying the box of cereal and for determining the action of the customer placing the box of cereal in his or her basket.

Objects and actions may be recognized or determined by any suitable technique. In an example, an object may be detected using a trained neural network model which is capable of identifying all SKUs in the store, and a motion tracking system may detect the gesture of a customer removing the item from the shelf and placing the item in a receptacle. Alternatively, the system may be configured to track both the identified object and identified customer, and subsequently link them together (customer and item add to order) based on the fact that they continue to move around the store together. In this example, because the object's motion is synchronized with the user's motion, the ownership of the item may switch from store/inventory item to the customer's order via an event to being triggered by the system to add the item to the order.

In response to determining that the first computing device does not have the predetermined resource availability for determining the object and/or action at block 402, the processing manager 326 of the computing device 304 designated as "COMPUTING DEVICE 1" may communicate 406 the acquired information to the computing device 304 designated as "COMPUTING DEVICE 2". Subsequently, at step 408, the second computing device may receive the acquired information and determine the object and/or action based on the received information. Continuing the aforementioned example of FIG. 1, the acquired video may be communicated from the first computing device 304 to the second computing device 304 via the network 306. Subsequently, the second computing device 304 may determine the object and/or action based on the received video.

Subsequently at block 410, the second computing device may communicated the determined object and/or action to the first computing device. Continuing the aforementioned example of FIG. 1, the second computing device 304 may communicate the identification of the customer, identification of the box of cereal, and identification of the action of the customer placing the box of cereal in his or her basket to the first computing device 304. In this way, the workload of determining the object and/or action is passed to a second computing device when the first computing device does not have resource availability for determining the object and/or action.

In accordance with embodiments, prior to communicating the acquired information at block 406, the processing manager of the first computing device may determine whether the second computing device has resource availability for determining the object and/or action. Such information about the resource availability of the second computing device may be provided to the first computing device from either the second computing device or another computing device. In response to determining that the second computing device has the needed resource availability, the first computing device may communicate the acquired information as set forth in block 406. On the other hand, in response to determining that the second computing device does not have the needed resource availability, the processing manager may determine whether another computing device has the needed resource availability in an effort to similarly offload processing of the acquired information to another computing device having the needed resource availability.

In accordance with embodiments, a processing manager of one computing device may determine whether another computing device is not currently acquiring information such as video. In response to determining that the other computing device is not acquiring information, the first computing device may communicate the information acquired by the first computing device to the other computing device for processing to determine the object and/or action.

In accordance with embodiments, a processing manager of a computing device may maintained a database of resource availability of computing devices to determine whether one or more may be used for offloading processing of acquired information to determine an object and/or action. For example, the processing manager 326 of the computing device 304 designed as "COMPUTING DEVICE 1" may maintain in memory 330 a database indicating resource availability of other computing devices connected via the communications network 306. This information may be used for determining whether to send acquired information to another one of the computing devices in response to determining that the computing device 304 designed as "COMPUTING DEVICE 1" does not have the needed resources available for determining the object and/or action.

In accordance with embodiments, computing devices may each be configured to determine an object and/or action based on a predetermined model. Different models may include Neural Networks, Deep Learning, machine learning, artificial intelligence (AI), data mining algorithms, and the like to determine an object or action. Further, two or more computing devices may cooperative use the predetermined model to determine an object and/or action based on acquired information, such as images or video captures by a sensor, such as sensor 102 shown in FIG. 1. In addition, a model implemented by a computing device may vary depending based on the location of its respective sensor(s) within an environment. For example, a model may be specialized for determined produce and its associated sensor may be placed within a produce section, such as produce section 112 in FIG. 1. In this example, the model may be better than others at identifying fruit and when a consumer places the fruit in his or her basket or cart. Another example may be used for having a model to detect customer faces or identifying shoppers. This model may be deployed near entrance/exits or aimed at high traffic areas where customer would be found where as the sensors for items may be aimed at products or shelves.

In accordance with embodiments, a computing device may offload to another acquired information to partially determine an object and/or action. For example, the other computing device, such as computing device 2 304 shown in FIG. 3, may receive acquired information from another computing device, such as computing device 1 304 shown in FIG. 3. Computing device 2 304 may generate analysis data of the received information for determining an object and/or action. Subsequently, computing device 2 304 may communicate the generated analysis data to computing device 1 304. The computing device 1 304 may determine the object and/or action based on the generated analysis data. In this way, the determination of the object and/or action can be supported by another computing device in order to distribute the workload among multiple computing devices.

Figure 5:
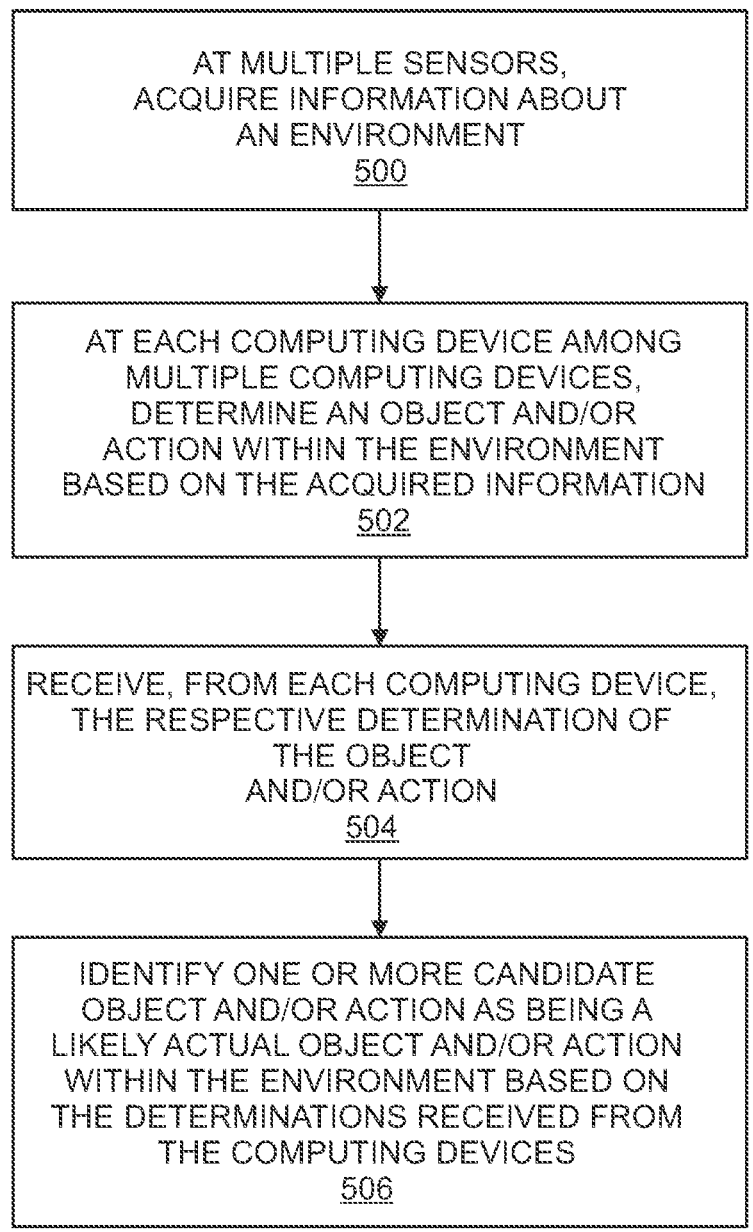
FIG. 5 is a flow chart of an example method for identifying objects or actions as being likely objects or actions within an environment in accordance with embodiments of the present disclosure.

FIG. 5 illustrates a flow chart of an example method for identifying objects or actions as being likely objects or actions within an environment in accordance with embodiments of the present disclosure. The method is described by example as being implemented by one of the sensors 302 and its respective computing device 304 shown in FIG. 3. Alternatively, the method may be implemented by any suitable sensor and computing device.

Referring to FIG. 5, the method includes acquiring 500, at multiple sensors, information about an environment. For example, sensors 302 may acquire video of different areas within a retail store. In other examples, the sensors 302 may acquire combinations of information (e.g., video, audio, and various other sensor collected data) about different areas within the retail store.

The method of FIG. 5 also includes individually determining 502, at each computing device connected to a respective one of the sensors, object and/or action within the environment based on the acquired information. The acquired information used by each computing device to determine the object and/or action may be different. Continuing the aforementioned example, each computing device 302 may use acquired information to determine the object and/or action. As an example, the processing manager 326 of the computing device 1 302 may determine an object and/or action based on information acquired by its respective sensor 302. In another example, the processing manager 326 of the computing device 1 302 may determine an object and/or action based on information acquired by its respective sensor 302 and also other sensors. In the example of FIG. 3, the information used by computing device 1 302 and computing device 2 302 for determining the object and/or action may be different. For example, computing device 1 302 may acquire video for identifying a customer at a location different than video acquired by computing device 2 302 for identifying the customer. In this instance, the computing devices 1 and 2 302 can make their determinations about the customer based on different acquired information and thus may identify the customer differently.

The method of FIG. 5 includes receiving 504, from each computing device, the respective determination of the object and/or action. Continuing the aforementioned example, the processing manager 326 of the server 310 may receive from computing device 1 304 and computing device 2 304 their respective determinations of an object and/or action. For example, computing device 1 304 determines the product picked up by a customer as being the cereal "corn flakes," while the computing device 2 304 determines the product picked up by the customer as being the cereal "raisin bran". The computing devices may also each assign a confidence level for the identification of its selected product.

The method of FIG. 5 includes identifying 506 one or more candidate object and/or action as being a likely actual object and/or action within the environment based on the determinations received from the computing devices. Continuing the aforementioned example, the processing manager 326 of the server 310 may identify the cereals "corn flakes" and "raisin bran" as being likely candidate products based on the determinations of computing device 1 304 and computing device 2 304. Further, the processing manager 326 of the server 310 may indicate the candidate objects and/or actions. For example, the processing manager 326 of the server 310 may display the candidate objects and/or actions.

The processing manager 326 of the server 310 may also generate and indicate comparison information among the candidate objects or actions. For example, the processing manager 326 may determine that there is 75% likelihood that the product is "corn flakes," and that there is a 25% likelihood that the product is "raisin bran". In this example, the processing manager 326 may select "corn flakes" as the product based on the higher likelihood of it being the actual product, and also because the price differential between the two products is small. In this instance, "corn flakes" may be determined as the product that the customer placed in his or her shopping bag or cart.

In an example use case, sensors and computing devices may be distributed throughout a store and some may be idle when others are in use in dense areas. For example, some of the sensors 208 shown in FIG. 2 may be video cameras that are idle during some periods of time. Also, when there is a lot of activity in an area (e.g., many customers in an area), a computing device may lack the processing power to maintain track of all customers within its video camera's field of view (FOV). In this case, some or all of the captured video may be communicated to another computing device having resource availability for processing as described in examples provided herein.

In another example use case, a computing device may assist another local computing device with processing acquired information for determining an object and/or action within an environment. Once the acquired information is processed and the object and/or action is determined, identification of the determined object and/or action may be communicated back to the local computing device needed assistance for replacing, augmenting, or building consensus of identification of the determined object and/or action. For example, the local computing device may have missed an object which was detected by the other computing device, and subsequently the identified object may be added to a list of items a customer. In another example, multiple computing devices can send back products found, and the store's system can add the products in common by the majority of computing devices across a series of video frames (e.g., one frame per computing device). Alternatively, for example, the same frame of video may be sent to each computing device, and they can each analyze the same image. In this example, the fastest result or consensus can also be used to trigger actions of the order (e.g., add items, send notification, alert customer, or alert associate).

In some embodiments, when a computing device is not processing, it may process secondary tasks. Example secondary tasks include, but are not limited to, inventory analysis, calibration, or enter a standby or low power mode.

In some embodiments, operation of the sensors can be coordinated. For example, when a video camera detects motion, an adjacent video camera can be notified to leave standby mode or pause its background task to prepare for the task of image processing in case the object or person causing the activity comes in FOV. This may include, but not be limited to, warming up of the video camera prior to processing.

In accordance with an example use case, a sensor (e.g., RFID tag) and associated computing device may determine that there are 3 boxes of cereal, while a video camera can only see one box and a scale (weight) returns the weight of 3 items. In this case, consensus among sensors can indicate that there are 3 items to add to the order for the customer.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A system comprising:
    a plurality of sensors configured to acquire information about an environment;
    a plurality of peer computing devices operatively connected via a network, each computing device being operatively connected to a respective one of the sensors, and each computing device being configured to determine one of an object and action within the environment based on the acquired information and a different predetermined model than another of the computing devices;
    a processing manager configured to:
        coordinate communication among the peer computing devices;
        determine whether a first computing device among the plurality of peer computing devices does not have predetermined resource availability for determining the one of the object and action;
        in response to determining that the first computing device does not have the predetermined resource availability, control the first computing device to communicate information acquired by the first computing device to a second computing device among the plurality of peer computing devices for determining the one of the object and action by use of the different predetermined model at the second computing device;
        receive, from the first computing device, a determination of identification of the one of the object and action;
        receive, from the second computing device, a determination of identification of the one of the object and action; and
        identify a plurality of candidate objects or actions as being likely actual object or actions within the environment based on the determinations received from the computing devices and the resources of the first and second computing devices and their associated sensors.

2. The system of claim 1, wherein the sensors are image capture devices, and wherein the acquired information comprises data associated with one or more images of the environment.

3. The system of claim 1, wherein the acquired information comprises one of radio frequency identifier data, weight information, smart shelf data, motion data, and coordinate information.

4. The system of claim 1, wherein the processing manager is configured to aggregate information from the computing devices.

5. The system of claim 1, wherein the processing manager is independent and remotely located.

6. The system of claim 1, wherein the predetermined resource availability comprises one of processing availability and memory availability.

7. The system of claim 1, wherein the second computing device is a model of computing device specialized to identify one of an object and a face, and
wherein the processing manager is configured to:
determine whether the second computing device has predetermined resource availability for determining the one of the object and action; and
in response to determining that the second computing device has the predetermined resource availability, control the first computing device to communicate the information acquired by the first computing device to a second computing device.

8. The system of claim 1, wherein the processing manager is configured to determine whether the second computing device is not acquiring information; and
in response to determining that the second computing device is not acquiring information, control the first computing device to communicate the information acquired by the first computing device to a second computing device.

9. The system of claim 1, wherein the computing devices are each configured to determine the one of the object and action based on a predetermined model, and
wherein the first computing device and the second computing device cooperatively use the predetermined model to determine the one of the object and action based on the one or more captured images.

10. The system of claim 1, wherein the second computing device is configured to:
generate analysis data of the information acquired by the first computing device for determining the one of the object and action; and
communicate the generated analysis data to the first computing device; and
wherein the first computing device determines the one of the object and action based on the generated analysis data.

11. A system comprising:
a plurality of sensors configured to acquire information about an environment;
a plurality of peer computing devices operatively connected via a network, each computing device being operatively connected to a respective one of the sensors, and each computing device being configured to individually determine one of an object and action within the environment based on the acquired information, wherein the acquired information used by each computing device to determine the one of the object and action is different, wherein the computing devices are each configured to determine the one of the object and action based on a predetermined model and wherein the predetermined model used by each computing device is unique;
a processing manager configured to:
coordinate communication among the peer computing devices;
receive, from each computing device, the respective determination of the one of the object and action; and
identify at least one candidate object or action as being a likely actual object or action within the environment based on the determinations received from the computing devices of different models and the resources of the computing devices and their associated sensors.

12. The system of claim 11, wherein the sensors are image capture devices, and wherein the acquired information comprises data associated with one or more images of the environment.

13. The system of claim 11, wherein the acquired information comprises one of radio frequency identifier data, weight information, smart shelf data, motion data, and coordinate information.

14. The system of claim 11, wherein the processing manager resides at one of the first computing device and another computing device.

15. The system of claim 11, wherein the acquired information used by each computing device to determine the one of the object and action is unique.

16. The system of claim 11, wherein the processing manager is configured to indicate a plurality of candidate objects or actions as being likely actual object or actions within the environment based on the determinations received from the computing devices.

17. The system of claim 16, wherein the processing manager is configured to indicate comparison information among the candidate objects or actions.

18. A method comprising:
using a plurality of sensors configured to acquire information about an environment;
coordinating communication among a plurality of peer computing devices, each computing device being operating connected to a respective one of the sensors;
determining whether a first computing device among the plurality of peer computing devices does not have predetermined resource availability for determining one of an object and action within the environment, wherein each computing device being configured to determine one of an object and action within the environment based on the acquired information and a different predetermined model than another of the computing devices;
in response to determining that the first computing device does not have the predetermined resource availability, controlling the first computing device to communicate information acquired by the first computing device to a second computing device among the plurality of peer computing devices for determining the one of the object and action by use of the different predetermined model at the second computing device;
receiving, from the first computing device, a determination of identification of the one of the object and action;
receiving, from the second computing device, a determination of identification of the one of the object and action; and
identifying a plurality of candidate objects or actions as being likely actual object or actions within the environment based on the determinations received from the computing devices and the resources of the first and second computing devices and their associated sensors.

19. The method of claim 18, further comprising:
determine whether the second computing device has predetermined resource availability for determining the one of the object and action; and
in response to determining that the second computing device has the predetermined resource availability, controlling the first computing device to communicate the information acquired by the first computing device to a second computing device.

20. The method of claim 18, further comprising:
determining whether the second computing device is not acquiring information; and
in response to determining that the second computing device is not acquiring information, controlling the first computing device to communicate the information acquired by the first computing device to a second computing device.

21. The method of claim 18, further comprising:
using, by each of the computing devices, a predetermined model to determine the one of the object and action; and
cooperatively using, but the first computing device and the second device, the predetermined model to determine the one of the object and action based on the one or more captured images.

22. The method of claim 18, further comprising, at the second computing device:
generating analysis data of the information acquired by the first computing device for determining the one of the object and action; and
communicating the generated analysis data to the first computing device; and
wherein the method further comprises determining, at the first computing device, the one of the object and action based on the generated analysis data.

23. A method comprising:
using a plurality of sensors configured to acquire information about an environment;
coordinating communication among a plurality of peer computing devices, each computing device being operating connected to a respective one of the sensors;
individually determining, by the plurality of peer computing devices, one of an object and action within the environment based on the acquired information, wherein the acquired information used by each computing device to determine the one of the object and action is different, wherein the computing devices are each configured to determine the one of the object and action based on a predetermined model and wherein the predetermined model used by each computing device is unique;
receiving, from each computing device, the respective determination of the one of the object and action; and
identifying at least one candidate object or action as being a likely actual object or action within the environment based on the determinations received from the computing devices of different models and the resources of the computing devices and their associated sensors.

24. The method of claim 23, further comprising indicating a plurality of candidate objects or actions as being likely actual object or actions within the environment based on the determinations received from the computing devices.

25. The method of claim 24, further comprising indicating comparison information among the candidate objects or actions.

* * * * *